United States Patent [19]
Jennings et al.

[11] 3,783,944
[45] Jan. 8, 1974

[54] IMPROVED PROCESS FOR THE RECOVERY OF OIL

[75] Inventors: Robert R. Jennings, Walnut Creek, Calif.; William M. Thornton, Houston, Tex.

[73] Assignees: Dow Chemical Company, Midland, Mich.; Marathon Oil Company, Findlay, Ohio; part interest to each

[22] Filed: Oct. 5, 1972

[21] Appl. No.: 295,204

[52] U.S. Cl.................................. 166/274, 166/273
[51] Int. Cl............................................. E21b 43/22
[58] Field of Search.................. 166/274, 273, 275; 252/8.55 D

[56] References Cited
UNITED STATES PATENTS

| | | | |
|---|---|---|---|
| 3,039,529 | 6/1962 | McKennon | 166/275 |
| 3,254,714 | 6/1966 | Gogarty et al. | 166/274 |
| 3,282,337 | 11/1966 | Pye | 166/275 |
| 3,476,186 | 11/1969 | Sarem | 166/274 |
| 3,482,632 | 12/1969 | Holm | 166/273 |
| 3,497,006 | 2/1970 | Jones et al. | 166/273 |
| 3,500,921 | 3/1970 | Abrams et al. | 166/273 |
| 3,523,581 | 8/1970 | Murphy | 166/273 |
| 3,532,166 | 10/1970 | Williams | 166/274 |
| 3,679,000 | 7/1972 | Kaufman | 166/273 |

*Primary Examiner*—Stephen J. Novosad
*Attorney*—William M. Yates et al.

[57] ABSTRACT

Improved oil recoveries, where the reservoir is flooded with a REM (recovery enhancing material) followed by a mobility control polymer, are obtained by either preceding the injection of the REM with a PCA (polymer conserving agent) or incorporating the PCA in a portion of the REM. The PCA, then, preferentially adsorbs onto available adsorption sites within the subterranean reservoir which otherwise would be occupied by the mobility control polymer. Examples of the PCA include polymers and copolymers of, for instance, acrylamide and sodium acrylate. They generally have an average molecular weight within the range of about 2000 to about 500,000.

15 Claims, No Drawings

IMPROVED PROCESS FOR THE RECOVERY OF OIL

BACKGROUND OF THE INVENTION

1. Field of the Invention

Fluids are injected into a subterranean reservoir through an injection means and displaced toward a production well to recover crude oil therethrough. Injected fluids include a polymer conserving agent which adsorbs onto the reservoir rock.

2. Prior Art to the Invention

It is known that during the flooding of a subterranean reservoir with mobility control polymers, e.g., partially hydrolyzed, high molecular weight polyacrylamides and copolymers of acrylamide and sodium acrylate, the polymer tends to adsorb onto the reservoir rock. This adverse phenomenon degrades the mobility control properties imparted by the polymer; i.e., it leaves a low viscosity bank of water which can readily finger through the REM bank. Jones in U.S.P. 3,482,631 prevents this adversity by saturating the adsorption sites with a mobility control agent, e.g., partially hydrolyzed, high molecular polyacrylamides — Jones' theory being to occupy adsorption sites so that a subsequently injected slug will not be adversely affected by "active" adsorption sites.

Williams in U.S.Pat. No. 3,532,166 overcomes the adsorption of polysaccharides out of aqueous solutions by incorporating within the solution sacrificial agents such as water soluble carbonates and/or water soluble, inorganic polyphosphates.

Murphy in U.S. Pat. No. 3,523,581 prevents adsorption of viscosifiers by admixing with an aqueous solution containing the viscosifier a sacrificial agent which preferentially adsorbs on the surfaces of the reservoir rock; examples of the agents include alkali metal polyphosphates.

To improve oil recoveries of secondary and tertiary recovery processes, the art teaches that surfactant systems such as water-external and oil-external emulsions and micellar dispersions are useful. Examples of such systems are taught in the following U.S. Pat. Nos: 3,275,075 to Gogarty et al.; 3,506,070 and 3,506,071 to Jones; 3,497,006 to Jones et al.; 3,330,344 and 3,348,611 to Reisberg; 3,126,952 to Jones; 3,373,809 to Cooke, Jr.; 3,288,213 to King et al.; 3,163,214 to Csaszar; and 3,302,713 to Ahearn et al. However, the surfactant systems must include mobility control to obtain maximum oil recovery. Most of the mobility control polymers tend to be "leached" out of solution when passing through reservoir rock due to adsorption of the polymer on the reservoir rock. The effect, of course, is degradation of mobility control, adversely influencing oil recovery results.

SUMMARY OF THE INVENTION

It has now been found that the problems inherent in the use of an aqueous polymeric material to drive a residual oil recovery enhancing material through a formation whose natural drive energy has been depleted can be essentially eliminated by the use of a polymer conserving agent ahead of said enhancing material.

More particularly the invention comprises a sequential method for introducing into a formation which contains residual oil, said formation having been depleted of its natural drive energy, first, a polymer conserving agent, secondly a recovery enhancing material, and lastly, an aqueous solution of a polymeric flooding material for mobility control.

DETAILED DESCRIPTION OF THE INVENTION

The displacing or flooding media which are suitable herein comprise water containing from 0.001 to 0.5 weight percent, preferably 0.01 to 0.15%, of a water-soluble organic mobility control polymer having a molecular weight of at least about $1.5 \times 10^6$, preferably at least about $2.5 \times 10^6$. Said polymers are of the formula

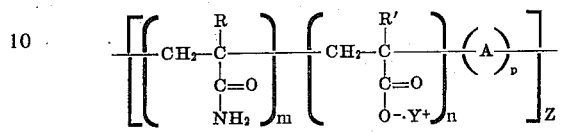

wherein R and R' are, independently, H or $-CH_3$; $Y^+$ is $H^+$, $-NH_4^+$ or an alkali (such as $Na^+$ or $K^+$) or alkaline earth (such as $Mg^{++}$ or $Ca^{++}$) metal ion; $m$ is 0 to 100, preferably 0 to about 33; $m + n + p$ equal 100; $Z$ is greater than about 200; and A is at least one of the following:

(1) 

wherein $R^1$ is H or $-CH^3$ and $X^1$ is

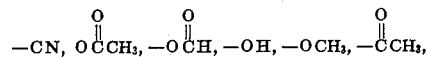

(2) 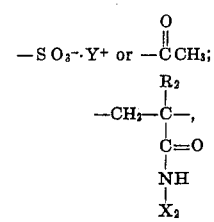

wherein each $R^2$ is H or $-CH_3$ and $X_2$ is

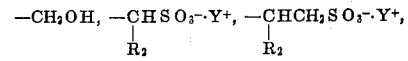

(3) 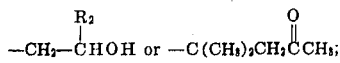

wherein q is 0 or 1;

(4) 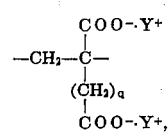

wherein $X_3$ is $-O^-\cdot Y^+$, $-NH_2$ or $-OR_3$ ($R_3$ being $-CH_3$ or $-CH_2CH_3$); or (5) 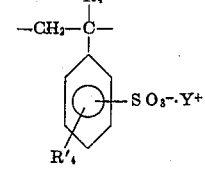

wherein $R^4$ and $R'^4$ are, independently, H or $-CH_3$.

For instance, polymers containing one or more of the monomers acrylamide, acrylic acid (and ammonium, alkali and alkaline earth metal salts thereof), acrylonitrile, vinyl acetate, vinyl formate, methyl vinyl ether and methyl acrylate are described in the following U.S. Pat. Nos.: 3,039,529 (McKennon) Col. 2, lines 9-18 and 51-67; 2,827,964 (Sandiford et al.) Col. 2, lines 7-17; 2,842,492 (Von Engelhardt et al.) Col. 1, lines 30-52; 3,282,337 (Pye) Col. 4, line 19 to Col. 5, line 27; 3,476,186 (Sarem) Col. 1, line 60 to Col. 2, line 73; and 2,625,529 (Hedrick) Col. 3, line 60 to Col. 7, line 65 and the examples thereof. Numerous other sources are also available.

Other suitable monomers are exemplified in the following: N-methylolacrylamide, salts of N-sulfomethylacrylamide, N-acryltaurine, N-(2-hydroxyethyl)-acrylamide, N-(diacetonyl)-acrylamide, and the like - Pye, Sarem (Col. 3, line 64 to Col. 8, line 67), and Hedrick; salts of itaconic acid - Von Engelhardt and Hedrick; maleic and maleamic acids, salts and half-esters thereof - Von Engelhardt and Hedrick; and styrene, vinyl toluene and alpha-methylstyrene sulfonates - Pye (Col. 5, line 28 to Col. 6, line 5) and Hedrick.

Von Engelhardt (Col. 1, lines 59–66 and Col. 2, lines 16-28) further shows the preparation of salts of some of the above.

Homopolymers and copolymers of acrylamide and acrylic acid or its salts demonstrate no solubility problems. However, it must be borne in mind that certain monomers characterized as —A— in the formula above must be solubilized. For instance, incorporation of more than about 65 weight percent acrylonitrile retards solubility; more than about 30 weight percent of the esters, ethers and ketone illustrated in Group (1) has the same effect; and, finally, if $X_2$ in Group (2) is more than about 40 weight percent alcohol or ketone residues, solubility is also adversely affected. However, incorporation of other —A— groups, or acrylamide or acrylic acid or acid salt monomers for the remainder of the copolymer will result in sufficient solubility.

It is typical in secondary oil recovery operations to utilize brine and polymer as the flooding medium. Often these brines contain divalent ions, such as $Ca^{++}$, which may precipitate the polymer. Therefore, the preferred mobility control polymers are those which do not precipitate in the presence of, for instance, $Ca^{++}$. Preferred polymers, then, are selected from the following group:

1. 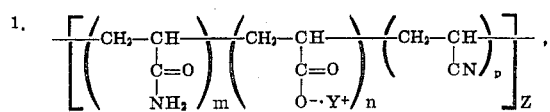

where $m + p$ is greater than about 35, $p$ is less than about 65, $n$ is greater than about 15, $m + n + p = 100$, $Y^+$ is as above defined and Z is greater than about 200;

2. 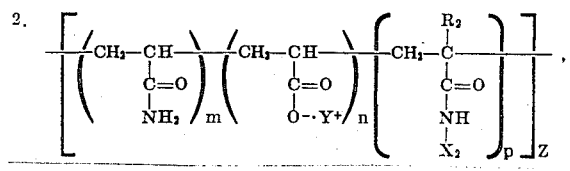

wherein $X_2$ is

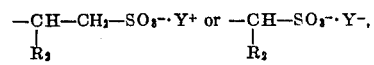

each $R_2$ is H or -$CH_3$, $m + p$ is greater than about 35, $n + p$ is greater than about 15, $m + n + p = 100$, $Y^+$ is as above defined and Z is greater than about 200;

3. 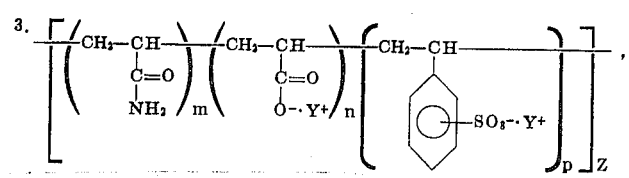

wherein $m + p$ is greater than about 35, $n + p$ is greater than about 15, $m + n + p = 100$, $Y^+$ is as above defined and Z is greater than about 200; or 4. 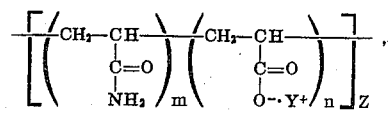

wherein $m$ is greater than about 35, $n$ is greater than about 15, $m + n = 100$, $Y^+$ is as defined above and Z is greater than about 200. Those polymers of Group 4 are the most preferred.

The polymer conserving agents which are suitable herein comprise water containing from about 0.005 to 50 weight percent of at least one water-soluble polymer selected from the group defined by the above formula, wherein, in said formula, $m$, $n$ and $p$ may each vary from 0 to 100, $m + n + p$ equaling 100; Z is less than about 70, preferably from about 0.2 to about 60; and R, R', Y and A are as defined above. Said conserving agents typically have a molecular weight between about 2,000 and about 500,000. Said agents are generally prepared from the same types of monomers as used for the mobility control polymers, the above sources regarding the description and preparation of the mobility control polymers being also applicable to the conserving agents. The preferred polymer conserving agents are also selected from the above groups (1–4). In addition, a preferred species is described when $m$ and $p$ are 0, $n$ is 100, R' is H, the other variables being as above described.

The polymer conserving agent is suitably introduced into the formation to be treated in an amount equal to from about 0.1 to 100 percent of the pore volume of said formation.

Both the mobility control polymers and the polymer conserving agents are suitable for use in either essentially pure water or in brines. The term "water" is used throughout to include brines as well as pure water.

The recovery enhancing material (herein referred to as REM) can be any displacing fluid which acts as a miscible or miscible-like displacing process and which preferably contains at least about 20 percent water.

Preferably the REM's are oil-external or water-external emulsions or oil-external or water-external micellar dispersions. The term micellar dispersion is meant to include micellar solutions, "transparent" emulsions, and microemulsions. Preferably the REM is a micellar dispersion containing from at least 4 to about 20 percent by volume of a petroleum sulfonate which preferably has an average equivalent weight within the range of about 350 to about 525; at least about 20 and up to about 94 percent by volume of water; about 2 to about 75 percent by volume of hydrocarbon; and optionally about 0.1 to about 20 percent by volume or more of a cosurfactant which preferably is an alcohol, ester, aldehyde, ketone, ether, mixture thereof, or like compound(s) containing one to about 20 or more carbon atoms and/or about 0.01 to about 5 percent, weight percent based on the water, of an electrolyte which preferably is an inorganic acid, inorganic base, or inorganic salt. Examples of useful REMs are defined in U. S. Pat. Nos. 3,254,714 to Gogarty et al.; 3,497,006 to Jones et al; 3,506,070 and 3,506,071 to Jones; 3,330,344 and 3,348,611 to Reisberg; 3,126,952 to Jones; 3,373,809 to Cooke, Jr.; 3,288,213 to King et al.; 3,126,952 to Jones; 3,163,214 to Csaszar; 3,512,586 to Holm; 3,302,713 to Ahearn et al.; 3,149,669 to Binder, Jr., et al.; 3,208,515 to Meadors; and 3,208,517 to Binder, Jr., et al.

Where the aqueous PCA solution precedes the REM, it is preferred the volume amount (percent pore volume) of PCA injected be about 0.1 to about 100 percent, preferably 0.5 to about 40 percent and more preferably about 1 to about 20 percent formation pore volume. Also, the PCA can be present in concentrations of about 0.005 to about 50 weight percent or more, preferably 0.05 to about 5.0 percent and more preferably about 0.1 to about 1 percent by weight. The aqueous solution containing the PCA can contain other additives to impart desired properties to the flooding process.

Where the PCA is incorporated into the REM slug, the concentration of the PCA can be about 0.01 to about 5 percent or more and preferably about 0.025 to about 2.5 percent and more preferably about 0.05 to about 1 percent by weight, based on the aqueous medium within the REM. As mentioned earlier, it is preferred that the REM contain at least 20 percent water. Preferably the REM is a micellar dispersion and more preferably a water-external micellar dispersion containing about 40 to about 95 percent by volume water.

After the REM slug is injected, an aqueous slug containing the mobility control polymer is injected (formation pore volumes of the mobility control polymer of about 5 to about 75 percent or more and preferably about 10 to about 50 percent are useful). Thereafter, a water drive is injected to displace the previously injected slugs toward the production means in fluid communication with the subterranean reservoir to recover crude oil therethrough.

In the preceding discussion, it has been assumed that the PCA is to be employed in quantities such that adsorption of the mobility control polymer will be prevented throughout the swept portion of the reservoir. This is necessary if a denuded bank of water is absolutely to be avoided. However, there are circumstances where some adsorption of the polymer may be allowed without loss of recovered oil. For example, it might be true that adsorption might be allowed to occur during the last quarter of the displacement process. The resulting bank of water would be insufficient in volume to finger throughout the REM slug before the flood is complete. When a situation like this exists, the quantity of PCA may be decreased by about 25 percent.

It should be made clear that the discussion above involves two distinct situations. Firstly, the REM slug is of such a nature that it can be formulated to match the mobility of the mixed oil-water bank which it displaces. This is true of the micro-emulsion system proposed by Gogarty. Some other REMs, such as alcohols and the like, might require the incorporation of special materials for mobility reduction. In these cases, adsorption of the mobility control polymer results in the production of a high mobility water bank between the polymer and the REM. This results in penetration and destruction of the REM. Secondly, the REM may be a water-based material, such as a surfactant solution. Employed without modification, it may be very inefficient in displacing the oil-water mixture which it is forming by the displacement of the reservoir fluids. This may be due to relative permeability effects or to viscous fingering. But, it occurs because the mobility of the REM is greater than the mobility of the oil-water mixture it is displacing. This inefficiency is reduced or eliminated by using the mobility control polymer, not only behind the REM, but in the REM as well. In this case, adsorption results in the formation of a deleterious high mobility REM bank between the low mobility REM bank and the mixture of oil and water which preceeds it through the reservoir. The PCA prevents the fingering of this polymer stripped portion of the REM slug through the oil-water bank which it is attempting to drive ahead of it.

SPECIFIC EMBODIMENTS

I. Oil in a particular field is produced by primary means, and then by water-flooding to near the economic limit. At the end of water-flooding, a large amount of the original oil in place remains in the pore spaces of the rock as an irreducible oil saturation. (This "residual oil saturation" is recognized as being due to entrapment by interfacial forces.) Reservoir parameters and the water-flood behavior indicate that this reservoir is a candidate for tertiary recovery using an oil external micellar solution as proposed by Gogarty (U.S. Pat. No. 3,406,754). A small volume (about five percent of the reservoir pore volume) of the micellar solution will be used. The micellar fluid will displace the residual oil from the pore spaces and drive it, and the water left from water-flooding, through the reservoir. The oil and water will precede the REM through the reservoir as a mixed bank. By the methods indicated by Gogarty, the mobility of the REM will be adjusted until it is equal to or less than the mobility of the mixed oil and water bank which precedes it. This will prevent bypassing of the oil-water bank by the REM bank because of miscible fingering.

As Gogarty indicates, it is necessary to reduce the mobility of the water following the REM to prevent deleterious fingering of the water through the reduced mobility REM. (These factors are thoroughly considered in GOGARTY, MEABOM, & MILTON, "Mobility Control Design for Miscible-Type Water-floods Using Micellar Solutions". J. Pet. Tech., p. 141, Feb. (1970). This is to be accomplished through the use of a hydrolyzed polyacrylamide mobility reducing polymer.

Laboratory tests in specimens of the formation from the subject field indicate that the desired reduction in mobility can be achieved through the use of 500 ppm of the polymer. However, laboratory tests also indicate that the polymer will be adsorbed to the extent of 300 pounds of polymer for each acre-foot of formation exposed to the polymer solution. If this adsorption occurs, a large volume of high mobility, polymer-free water will be produced between the front of the polymer solution and the back of the micellar recovery enhancing agent. If this is allowed to occur, the water will penetrate the small slug of the micellar fluid, which will be bypassed to an undesirable degree. Heterogeneity in the reservoir will accentuate the bypassing. This effect can be eliminated by injecting into the formation a polymer conserving agent ahead of the micellar solution slug. A good example would be a relatively low molecular weight hydrolyzed polyacrylamide.

Laboratory tests are run to determine the adsorption loss of the PCA on the formation. The methods of the aforementioned application may be used. The total amount of PCA to be injected is calculated from the reservoir volume to be treated and the value of the adsorption loss determined in said laboratory tests.

It is desirable that the PCA solution used ahead of the REM not have a mobility in the reservoir greatly lower than that of water. This is because the PCA will be present in the aqueous phase of the mixed oil-water bank which is driven by the REM, and the mobility of the mixed bank can be reduced if the mobility of the PCA is much lower than that of water. (The importance of this effect can be calculated from the methods given in the above paper by Gogarty). Significant reduction in the mobility of the mixed bank would require further adjustment in the REM and an increase in the level of mobility control polymer following the REM. To prevent a significant mobility increase, the molecular weight of the PCA selected is as low as possible, and the PCA is used at a concentration which does not produce a significant increase in the viscosity of the water. It is preferable to use water of a salinity equal to 0.5 percent sodium chloride or greater for the PCA solution. This will have the effect of keeping the viscosity down. This would be undesirable if laboratory measurements indicated that the added salt increased PCA adsorption significantly.

Consistent with these considerations of mobility, the PCA solution would normally be injected at as high a concentration as possible until the required weight of agent had been started through the reservoir. If, for example, the PCA adsorption is found to be 300 lbs. per acre-foot of formation, and a practical volume for injection into the reservoir is 5 percent of the pore volume of a reservoir rock of 25 percent porosity, then the PCA concentration can be calculated to be approximately 0.9 percent.

To assure that the system is workable, a test core is saturated with water and oil to simulate the conditions which would exist at the end of water-flooding. This core is flooded thoroughly with the intended PCA solution, then with a small volume of the REM material, and, finally, with polymer solution. (This core need not be from the subject field, but extreme contrasts in mobility should be avoided). Successful displacement of the residual oil shows that the introduction of the PCA ahead of the REM is not interfering with the effectiveness of the latter.

As a result of the preceding test program, the following materials are sequentially injected into the reservoir:

1. A 5 percent slug of a 0.9 percent solution of the PCA.
2. A 5 percent slug of the micellar solution.
3. Mobility control polymer solution of kind, concentration, and volume indicated by methods similar to those described by Gogarty.

II. Core tests were run to determine the effect on oil production of utilizing a PCA in advance of a REM.

Berea sandstone cores 4 feet long × 3 inches in diameter were prepared for tertiary flooding by first saturating the cores with water containing 18,000 ppm of TDS (total dissolved solids), thereafter flooding the cores with crude oil having a viscosity of 7 cp at 22°C. to residual water saturation and then flooding the cores with the 18,000 TDS water to residual oil saturation. The cores had permeabilities of about 100-200 md (millidarcies).

The cores were then flooded in the indicated sequence with water solutions of a PCA, a micellar solution and a mobility control polymer. The water referred to contained about 500 ppm of TDS.

The PCA utilized is defined by the above generic formula when $m$ and $n$ are 50, $p$ is 0, $Y^+$ is Na, R and R' and H and Z is about 2,500. The mobility control polymer utilized was Dow PUSHER 700, available from The Dow Chemical Company, Midland, Michigan. The micellar solution contained 14.5 percent of an ammonium petroleum sulfonate (average equivalent weight = 410), 4.2 percent vehicle oil (from the sulfonate), 8.3 percent crude oil having a viscosity of 7 cp at 22°C., 59.5 percent distilled water, 2.8 percent of inorganic salt, and 0.6 percent of primary hexanol, the percents based on weight. In all the cases, water containing 500 TDS was injected to displace the slugs through the cores.

The sequence and results are given below:

| Run | Description of Flood | % Oil Recovered |
|---|---|---|
| 1 | 4% PV (pore volume) of the micellar solution is followed by 70% PV of water containing 300 ppm of Dow PUSHER 700 polymer. | 61 |
| 2 | 4% PV of the micellar solution followed by 10% PV of water containing 5,000 ppm of PCA and 300 ppm Dow PUSHER 700 polymer and then 60% PV of water containing 300 ppm of Dow PUSHER 700 polymer | 70 |
| 3 | 10% PV of water containing 5,000 ppm of PCA, then 4% PV of the micellar solution followed by 70% PV of water containing 300 ppm of Dow PUSHER 700 polymer. | 80 |
| 4 | 4% PV of the micellar solution followed by 70% PV of water containing 600 ppm of Dow PUSHER 700 polymer. | 76 |
| 5 | 4% PV of the micellar solution followed by 10% PV of water containing 5,000 ppm of PCA and 600 ppm of Dow PUSHER 700 polymer and then 60% PV of water containing 600 ppm of Dow PUSHER 700 polymer. | 78 |
| 6 | 10% PV of water containing 5,000 ppm of PCA followed by 4% PV of the micellar solution and then 70% PV of water containing 600 ppm of Dow PUSHER 700 polymer. | 93 |

The above data clearly indicates the polymer conserving agent improves oil recoveries and especially so where the conserving agent is injected previous to the injection of the micellar solution.

We claim:

1. In a process for recovering petroleum from a subterranean oil-bearing formation by introducing into one or more input wells penetrating said formation a recovery enhancing material comprising a miscible or miscible-like displacing fluid and a flooding medium comprising water containing from 0.001 to 0.5 weight percent of a water-soluble organic mobility control polymer having a molecular weight of at least about $1.5 \times 10^6$, said polymer being of the formula

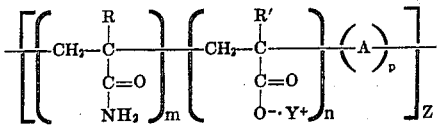

wherein R and R' are, independently, H or —CH$_3$; Y$^+$ is H$^+$, —NH$_4^+$ or an alkali or alkaline earth metal ion; m, n and p vary from 0 to 100, $m + n + p$ equaling 100; Z is greater than about 200; and A is at least one of the following:

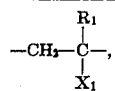

wherein R$_1$ is H or —CH$_3$ and X$_1$ is

—CN, —OČCH$_3$, —OČH, —OH, —OCH$_3$, —ČCH$_3$, —SO$_3^-$·Y$^+$ or

—ČOCH$_3$;

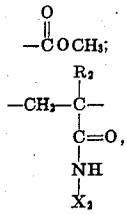

wherein each R$_2$ is H or —CH$_3$ and X$_2$ is

—CH$_2$OH, —CHSO$_3^-$·Y$^+$, —CHCH$_2$SO$_3^-$·Y$^+$, —CH$_2$—CHOH, or

—C(CH$_3$)$_2$CH$_2$ČCH$_3$;

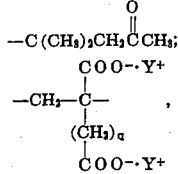

wherein q is 0 or 1;

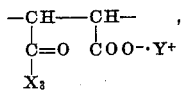

wherein X$_3$ is —O$^-$·Y$^+$, —NH$_2$ or —OR$_3$ (R$_3$ being —CH$_3$ or —CH$_2$CH$_3$); or

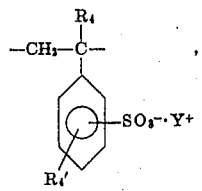

wherein R$_4$ and R'$_4$ are, independently, H or —CH$_3$;

the improvement comprising introducing into said input well or wells prior to or concurrently with the recovery enhancing material an amount of a polymer conserving agent which equals from about 0.1 to 100 percent of the pore volume of the formation to be treated, said polymer conserving agent comprising water containing from about 0.005 to 50 weight percent of at least one water-soluble polymer selected from the group defined by the above formula, wherein, in said formula, Z is less than about 70, the other variables being as defined above.

2. The process of claim 1 wherein, in the formula describing the mobility control polymer, n varies from 0 to about 67 and p varies from 0 to about 33.

3. The process of claim 1 wherein, in the formula describing the polymer conserving agents, Z varies from about 0.2 to about 60.

4. The process of claim 1 wherein the flooding medium comprises water containing from about 0.01 to 0.15 weight percent of the mobility control polymer.

5. The process of claim 1 wherein the molecular weight of the mobility control polymer is at least about $2.5 \times 10^6$.

6. The process of claim 1 wherein the polymer conserving agent comprises water containing from about 0.05 to 5 weight percent of polymer.

7. The process of claim 1 wherein the polymer conserving agent is employed at from about 0.5 to 40 percent of the pore volume.

8. The process of claim 1 wherein the mobility control polymer is selected from the group:

A. 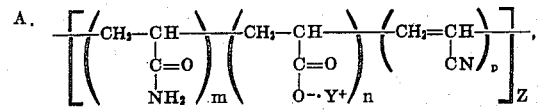

wherein $m + p$ is greater than about 35; p is less than about 65; n is greater than about 15; $m + n + p = 100$; Y$^+$ is H$^+$, —NH$_4^+$ or an alkali or alkaline earth metal ion; and Z is greater than about 200;

B. 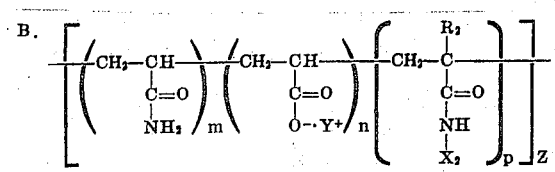

wherein X$_2$ is

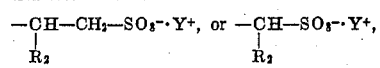

each R$_2$ is H or —CH$_3$, $m + p$ is greater than about 35, $n + p$ is greater than about 15, $m + n + p = 100$ and Y$^+$ and Z are as above;

C. 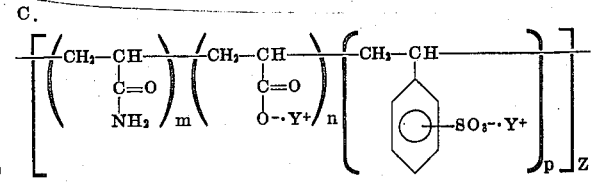

wherein $m + p$ is greater than about 35, $n + p$ is greater than about 15, $m + n + p = 100$ and Y$^+$ and Z are as above; or D. 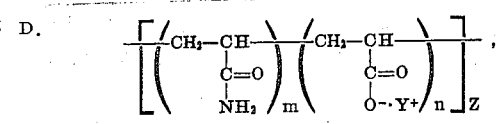

wherein $m$ is greater than 35, $n$ is greater than about 15, $m + n = 100$ and $Y^+$ and $Z$ are as above.

9. The process of claim 8 wherein the polymer conserving agent is water containing at least one polymer selected from the group A to D in said claim 8, wherein, in the formulas, $Z$ is greater than about 0.2 but less than about 60, the other variables being as defined therein.

10. The process of claim 1 wherein the mobility control polymer is of the formula

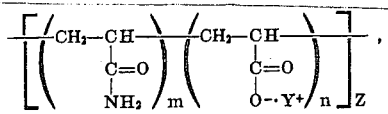

wherein $m$ is greater than about 35, $n$ is greater than about 15, $m + p = 100$ and $Y^+$ and $Z$ are as above, and the polymer conserving agent is water containing a polymer of the formula

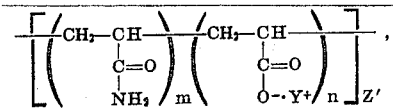

wherein $Z'$ is between about 0.2 and 60, and $Y^+$, $m$ and $n$ are as above defined.

11. The process of claim 1 wherein, in the formula describing the polymer conserving agents, $m$ and $p$ are 0, $n$ is 100 and $R'$ is H, the other variables being as defined therein.

12. The process of claim 1 wherein the recovery enhancing material contains at least about 20 percent by volume of water.

13. The process of claim 1 wherein the recovery enhancing material is an oil-external emulsion, a water-external emulsion, an oil-external micellar dispersion or a water-external micellar dispersion.

14. The process of claim 1 wherein the recovery enhancing material is a micellar dispersion containing from about 20 to about 94 volume percent of water.

15. The process of claim 1 wherein the recovery enhancing material is a micellar dispersion containing from at least 4 percent to about 20 percent by volume of a petroleum sulfonate; at least about 20 percent and up to about 94 percent by volume of water; about 2 percent to about 75 percent by volume of hydrocarbon; and, optionally, about 0.1 to about 20 percent by volume or more of a cosurfactant.

* * * * *

UNITED STATES PATENT OFFICE
CERTIFICATE OF CORRECTION

Patent No. 3,783,944   Dated January 8, 1974

Inventor(s)   R. R. Jennings and W. M. Thornton

It is certified that error appears in the above-identified patent and that said Letters Patent are hereby corrected as shown below:

Column 2, lines 18 and 19 a phrase has been left out. The entire two lines with the proper additions should read:

-- line earth (such as $Mg^{++}$ or $Ca^{++}$) metal ion; m is 0 to 100; n is 0 to 100, preferably 0 to about 67; p is 0 to 100, preferably 0 to about 33; m + n + p equal 100; Z --

Column 2, lines 22 through 26 should be:

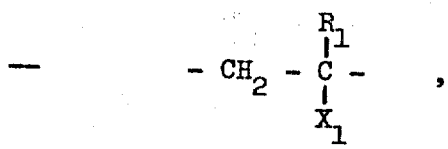

wherein $R_1$ is H or $-CH_3$ and $X_1$ is   --

Column 2, line 40 should be:

-- wherein each $R_2$ is H or $-CH_3$ and $X_2$ is   --

Column 2, last line should be:

-- wherein $R_4$ and $R'_4$ are, independently, H or $-CH_3$. --

Certificate of Correction
U.S. Patent No. 3,783,944
Inventor: R. R. Jennings and W. M. Thornton Page 2
Dated January 8, 1974

Column 4, line 10 should be:

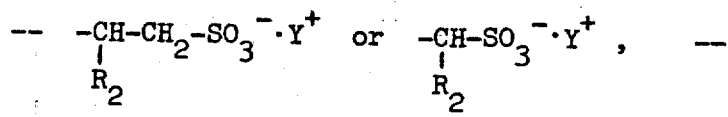

Column 10, line 28 should be:

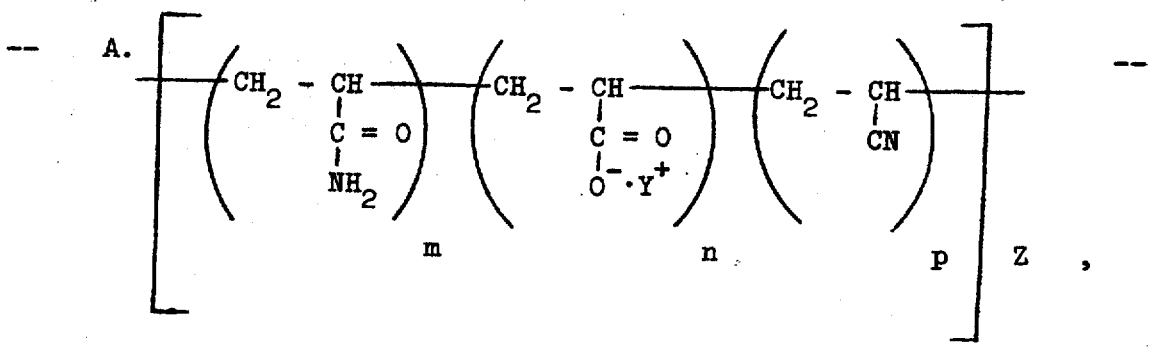

Signed and sealed this 19th day of November 1974.

(SEAL)
Attest:

McCOY M. GIBSON JR.
Attesting Officer

C. MARSHALL DANN
Commissioner of Patents